United States Patent [19]

Gagnieu et al.

[11] Patent Number: 5,116,966
[45] Date of Patent: May 26, 1992

[54] PROCESS FOR SEPARATION OF SULFATED GLYCOSAMINOGLYCANS

[75] Inventors: Christian Gagnieu, Lyon; Michel DuBois, Chaponost, both of France

[73] Assignee: Societe De Developpement Des Utilisations Du Cuir - SADUC, Chaponost, France

[21] Appl. No.: 460,644

[22] Filed: Jan. 3, 1990

[30] Foreign Application Priority Data

Jan. 5, 1989 [FR] France .................. 89 00564

[51] Int. Cl.$^5$ .................. C08B 34/00; C08B 34/02; C08B 37/08; C08B 37/10
[52] U.S. Cl. .................................. 536/50
[58] Field of Search .......................... 536/50

[56] References Cited

U.S. PATENT DOCUMENTS 3,909,405 9/1975 Aoyama .................. 210/711

FOREIGN PATENT DOCUMENTS 0020183 12/1980 European Pat. Off.
2074178 10/1981 United Kingdom.

OTHER PUBLICATIONS

Grant et al., "Grant and Hackh's Chemical Dictionary", 5th ed. p. 516.
Chemical Abstracts Nos. 88:184937g, Jun. 19, 1978, p. 271.
Yasuo Kikuchi, "Polyelectrolyte Complex of Heparin with Chitosan", Die Makromolekulare Chemie, vol. 175, 1974, pp. 2209-2211.

Primary Examiner—Nathan M. Nutter
Assistant Examiner—Jeffrey Culpeper Mullis
Attorney, Agent, or Firm—Oliff & Berridge

[57] ABSTRACT

The present invention relates to a process for purifications of natural or synthetic polymers in solution, water-soluble or soluble in water-alcohol medium and comprising sulfate groups, the process consisting essentially, on the one hand, of a selective precipitation in which the sulfated polymers to be purified are complexed in acid medium with a polyamine insoluble at a pH greater than 7 and, on the other hand, after isolation of the complex thus formed, of a progressive solubilizing of the sulfated polymers.

13 Claims, No Drawings

PROCESS FOR SEPARATION OF SULFATED GLYCOSAMINOGLYCANS

BACKGROUND OF THE INVENTION

The present invention relates to the separation of sulfated glycosaminoglycans, referred to in abbreviated form as sGAG.

The sGAG considered in the present invention are biopolymers of human or animal origin, of the polysaccharide type, among which there may be mentioned:
chondroitin 4-sulfate and 6-sulfate
dermatan sulfate
keratan sulfate
heparin sulfate and heparins.

For more details concerning these sGAG, or mucopolysaccharides, it will be useful to refer to the following bibliographical reference:

Aspinall, G. O., Polysaccharides, Pergamon Press, Oxford (1970), the contents of which are incorporated in the present description as and when necessary.

Various technical sectors require ever greater quantities of sGAG of ever greater purity. In this respect, mention may be made of the medical field using biomaterials, in particular as replacement for human skin.

The sGAG are obtained from various animal tissues: cartilage, cornea, skin and connective tissues in general. In order to obtain or extract the sGAG from these primary materials, the latter are ground in order to obtain a ground mixture or hydrolyzate in an aqueous phase. The proteoglycans present in the ground mixture are then degraded so as to eliminate their proteic parts and to obtain a complex medium comprising GAG, and in particular sGAG. This degradation is carried out using conventional techniques, such as digestion by wide-spectrum proteases, or hydrolysis in a basic medium.

The complex medium obtained in accordance with the above contains, in addition to the sGAG, various contaminants, polymeric or otherwise, of ionic nature or otherwise. Of these contaminants, particular mention may be made of those having amino acid groups, such as various proteins, various peptides of amphoteric nature, in particular those having carboxyl groups carried by glutamic acid and aspartic acid residues; these contaminants are not generally covalently bonded to the sGAG of the complex medium.

DESCRIPTION OF THE PRIOR ART

At the scientific or practical level, various methods have been proposed for separating, by precipitation, a sGAG present in a starting complex medium.

Of these methods, the principal ones to be considered are those consisting in precipitating the sGAG selectively in aqueous medium, by complexing with a water-soluble polyelectrolyte in such a medium, in particular a polyamine, such as chitosan. The following documents have described and discussed the formation of such a complex:

(a) Die Makromolekulare Chemie [Macromolecular Chemistry] 175,2209-2211 (1974), a report by Yasuo Kikuchi entitled "Polyelectrolyte complex of Heparin with chitosan"; according to this document, the agent for precipitating the sGAG is a water-soluble polyamine, namely chitosan (b) Document EP-A-0,020,183; according to this document, the agent for precipitating the sGAG is a carboxymethyl-chitin, N-acyl-chitosan, or a derivative of these two substances (c) Biopolymers 1978, 17(3), 805-10 (Eng.) publication by Hirano, S; Mizutani, C; Yamaguchi, R; Mirura, O; according to this document, the precipitating agent is a chitosan partially N-acetylated in acid medium.

None of the documents previously examined dealt with the subsequent separation of the sGAG, from the precipitate or complex obtained.

Document (a) envisages or describes the solubility of the complex obtained in a ternary solvent, for example water/hydrochloric acid/methanol, but without any specific detail regarding such or such a constituent of the ionic macromolecular complex.

Document (b) describes the solubility of the complex obtained, depending on its concentration, in an alkaline, acid or neutral solution, again without specifying the two constituents of the ionic macromolecular complex, and as a means for forming the complex obtained, for extrusion of fibers or films for example. It is indicated in the passage that, depending on the concentration of the complex in the aqueous solution, it is also possible to obtain a gel, that is to say a tridimensional macromolecular structure of the complex, trapping the aqueous solvent, this structure then being indissociable. Furthermore, it should be emphasized that the solubility of the complex in an alkaline medium only exists by virtue of the precipitating agent chosen according to this document, namely carboxymethylchitin, N-acyl-chitosan, or derivatives of the same type, since chitosan is insoluble in basic aqueous medium.

Document (c) neither indicates nor describes any subsequent treatment of the complex obtained.

Consequently, if the documents previously examined have disclosed and described the specific or fractionated precipitation of the sGAG using different polyelectrolytes in aqueous medium, it is essentially for purposes of characterizing these same sGAG, for example in analytical techniques.

None of these documents has really dealt with the separation of these same sGAG in a complex medium, under industrial conditions, that is to say as a technique for producing relatively pure sGAG.

According to the document GB-A-2,074,178, a method for selective separation of heparin has been proposed, which consists in:

obtaining a polyamine which is insoluble in aqueous medium, whatever the pH, having the form of a cationic resin, very different in chemical terms from a polysaccharide such as chitosan bringing the starting medium, comprising the heparin, into the presence of the resin in order to trap the heparin by ionic bonding regenerating the resin, using an aqueous saline solution of sodium chloride, in order to recover the heparin, the cationic resin remaining insoluble in the aqueous regeneration solution.

Such a method has the following disadvantages.

It is a method specific to heparin and cannot be extended in general to all sGAG.

Such a method proves to be relatively non-selective with respect to complex media, containing the contaminants as outlined above, such as for example hyaluronic acid.

The yield from the resin regeneration phase remains low, so that the overall yield of the method according to GB-A-2,074,178 also remains low, which renders said method unsuitable for industrial extrapolation or use.

The kinetics of the sGAG complexing remain relatively slow in view of the preliminary and necessary diffusion of the medium containing the heparin in the meshes of the cationic resin toward the amine groups or sites of the latter. Such kinetics also thwart the industrial application of such a method.

SUMMARY OF THE INVENTION

The present invention aims to overcome the above disadvantages and relates to a process or method for separation of sGAG from a complex medium containing contaminants "concurrent" to the sGAG, using an agent for precipitation or complexing by macromolecular ionic means, namely a water-soluble polyamine in acid medium, for example chitosan. More specifically, the invention relates to a process compatible with industrial production in terms of yield (as close as possible to 100%), kinetics, and purity of the sGAG obtained.

According to the present invention, the process involves two essential stages:

(1) in a first precipitation stage, the water-soluble polyamine is mixed with the starting complex medium, while maintaining the pH of the mixture at a value below the ionic dissociation potential (pKa) of the free carboxyl groups of contaminants and sGAG, in order to obtain selectively a precipitated ionic macromolecular complex, essentially between the sGAG and the water-soluble polyamine (2) in a second stage, in a suspension medium of the precipitate, the sGAG is solubilized and at the same time the polyamine is maintained in insoluble form, the suspension medium comprising a concomitant displacing agent of ionized carboxyl groups of the sGAG, and ionized amine groups of the polyamine.

According to the invention, the water-soluble polyamine used, for example chitosan, is soluble both in the starting complex medium and under certain conditions in the suspension medium of the precipitate.

From the sGAG solution obtained by means of the second stage it is possible to isolate the sGAG sought by any suitable means (e.g. filtration, centrifugation).

The process according to the present invention additionally affords the following substantial advantages or results.

During the second stage, the dissolution of the complex is selective in terms of the sGAG alone, which facilitates the subsequent recovery of the latter. In some circumstances the second stage on its own permits recovery of the sGAG, in particular when the displacing agent is an alkaline sulfate.

The polyamine obtained in solid form in the second stage can be recycled, if appropriate, after neutralizing in basic medium.

The second stage according to the invention prevents any formation of gel by the polyamine, as could be the case with a suspension medium comprising a monovalent anion salt, for example sodium chloride. Such gels are incompatible with an industrial technique on account of difficulties in their centrifugation or filtration.

The process according to the invention essentially preserves the physico-chemical integrity of the separated sGAG, and thus their properties, for example the coefficient of sedimentation.

The process according to the invention can be applied to a wide range of concentrations of the sGAG in the starting complex medium, from low concentrations of the order of 0.01% by weight up to high concentrations of the order of 20% by weight, the most suitable concentrations being between 0.05 and 5% by weight.

The process according to the invention can be implemented using substances which are inexpensive, non-toxic, and thus compatible with the medical applications of the separated sGAG.

The displacing agent is preferably:

a polyvalent anion salt, for example an alkaline sulfate; or a strong inorganic base, in particular sodium hydroxide or potassium hydroxide.

Moreover, these two agents can be used successively.

In the first case, the polyvalent anions, for example the bivalent ions of sodium sulfate, form together with the polyamine, for example the chitosan, a complex of electrostatic nature, insoluble in aqueous medium, as shown below:

These electrostatic-type bonds displace the preexisting bonds:

which completely releases the sGAG into solution.

This release is virtually complete when the $SO_4-/NH_3+$ (chitosan) ratio is at least 0.5.

Such a method makes it possible to obtain a volume of precipitate of the polyamine which is distinctly less than the volume of the ionic macromolecular complex, and this permits precipitation of the polyamine in low volumes of the suspension medium, in order to obtain solutions of sGAG capable of attaining 10% by dry weight.

This first method will be preferred to the second when the sGAG to be separated are hydrolyzable in basic medium at pH's greater than 10.5-11, for example heparin sulfate.

In the second case, the inorganic base causes an ionic displacement in accordance with the following reaction scheme:

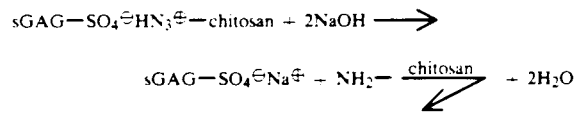

The sGAG are solubilized by formation of their sodium salts, completely ionized. And the chitosan becomes insoluble by loss of its ionization at the level of the amine groups.

This second method can be used alone for the purification of chondroitin 4-sulfate and 6-sulfate.

This second method proves to be relatively fast for releasing the sGAG and makes it possible to release the polyamine directly in solid form, which can then be immediately recycled.

And the combination of the two methods, namely a polyvalent anion salt followed by a strong inorganic base, permits release both of the sGAG in its disodium form for example, in concentrated solution, and the non-ionized polyamine in solid form. For example, according to this method, a suspension of the complex in water has added to it a quantity of sodium sulfate equivalent to a ratio of at least 0.5 between the sulfate ions and the amine groups present in the chitosan complex.

The suspension is stirred at ambient temperature, then alkalinization of the medium is carried out until a stable pH of between 8.5 and 11 is obtained. The suspension is stirred and the sGAG solution is recovered by filtration or centrifugation.

The combination of the two methods according to the invention can be used in all cases.

Moreover, the chitosan used in the process of the invention is preferably obtained by N-deacetylation of chitin from crustaceans.

Its molecular weight is not less than 50 KD, but it preferably has a value greater than 500 KD, while its degree of acetylation is between 0 and 30%, preferably 0-20%.

According to one mode of implementation of the invention, the process consists in successively carrying out the following stages:

(a) acidification of the starting complex medium to bring it to a pH of between 1 and 4;

(b) preparation of an acid solution of the polyamine at a pH of between 1 and 4;

(c) mixing, with stirring, of the acidified complex medium and the polyamine acid solution so as to obtain an ionic macromolecular complex;

(d) isolation of the complex, then dissolving the sGAG, by suspending the complex in an aqueous alkaline solution at a pH between 9 and 13, while maintaining gentle stirring;

(e) recovery of the liquid fraction of sGAG obtained; neutralizing of this liquid fraction by means of acid, removal of salts from this liquid fraction.

The sGAG in solution thus obtained can be converted into a solid form by any suitable means known per se, such as precipitation, lyophilization or simple dehydration.

In order to acidify the starting complex medium, it is preferable to use an inorganic acid such as hydrochloric acid, a pH value of the order of 2 being considered as optimal.

Furthermore, a monocarboxylic organic acid such as acetic acid is advantageously used for the preparation of the acid solution of chitosan, at a pH of the order of 3, the chitosan concentration of this solution being equal to approximately 1%.

The mixture of sGAG starting solution/chitosan acid solution is stirred for a period of between 20 minutes and 1 hour 30 minutes.

The alkalinization of the solution for dissolving the sGAG is preferably carried out using aqueous sodium hydroxide, gentle stirring being maintained for two to twenty-four hours.

In stage (b) of the implementation preferred and defined hereinabove, the chitosan is dissolved in a solution of inorganic or organic acid, maintained at a pH of between 1.5 and 3.7. This viscous solution must not contain more than 1.5% of chitosan. A concentration of 1% is preferably used.

It should be noted that the starting complex medium and the chitosan acid solution can have identical or different pH values, fixed by adding, to each of them, solutions of monocarboxylic inorganic or organic acids, with the exception of acids containing anions of valency greater than 1, such as sulfuric acid or phosphoric acid for example.

When inorganic acids such as hydrochloric acid are used, the pH of the starting complex medium must be between 1.5 and 2.5, and the chitosan acid solution must be brought to a pH situated within the same range.

When organic acids such as acetic acid or formic acid are used, the pH's must be between 3 and 3.7 for acetic acid and 2.5-3.5 for formic acid. In all cases, whatever the carboxylic acid used, the pH must be no greater than 3.8; similarly, whatever the inorganic acid used, the pH must not exceed 2.5

As indicated hereinabove, the two solutions reacting in stage (c) can be brought to acid pH by different acids. Thus, the starting complex medium can be adjusted to pH 2 by hydrochloric acid, and the chitosan solution to pH 3 by formic acid, or to pH 3.5 by acetic acid, for example.

All combinations are possible, but the starting complex medium is generally acidified by an inorganic acid, preferably by hydrochloric acid. This sGAG solution must be clear before precipitation by the chitosan.

The following stage involves the formation of a sulfated glycosaminoglycan/chitosan complex by selective precipitation. It consists in slowly adding the chitosan solution to the starting solution of sulfated glycosaminoglycans, maintained under strong stirring, it being possible, of course, for this sequence of addition to be reversed.

A white precipitate then forms instantly, and the addition of the chitosan is continued until precipitation is complete, which can be assessed by the increase in the viscosity of the solution as soon as the chitosan is in excess.

The complex formed is insoluble in the precipitation medium on account of the formation of ionic bonds between the glycosaminoglycan sulfate groups and the chitosan amine groups. These bonds, established between numerous chains of the two polymers, result in the formation of a dense network of high molecular weight.

The contaminating species in the starting complex medium, identified above, are capable of contracting electrostatic bonds with the chitosan. These bonds are established when the carboxylic groups of the amino acids are ionized. In contrast, when the medium is unfavorable to ionization, the electrostatic interactions with the chitosan are greatly reduced, or even non-existent. These unfavorable conditions are obtained by acidification of the medium to pH's very much below the pKa of the free carboxyl groups of the contaminants.

The sulfated glycosaminoglycans present in the medium contain, on one and the same molecule, both carboxylic acid groups and sulfate groups. Suppression of the ionization of the carboxyl groups alone, whose pKa is close to 3.5, is obtained by acidification of the medium to pH's also below the pKa of the carboxyl groups of the sGAG. In contrast, the sulfate groups, which can be considered as strong acid groups, will remain ionized at pH's of between 1.5 and 2.5. Under these conditions the only molecules contained in the starting complex medium, which can contract electrostatic bonds with the chitosan, are the glycosaminoglycans, these bonds being established at the level of their sulfate groups.

It can be shown that, at a pH of between 1.5 and 2.5, the precipitation of the sulfated glycosaminoglycans is complete when the quantity of chitosan involved in the formation of the complex corresponds to an equality of number between the free amine groups of this compound and the glycosaminoglycan sulfate groups.

At the end of precipitation the suspension obtained is stirred for 30 minutes to 1 hour and is then centrifuged. The supernatant is removed and the precipitate is suspended in ten to fifty times its volume of water, by violent stirring or by grinding. The suspension is centrifuged and the deposit is recovered.

The chitosan/glycosaminoglycan complex is in the form of soft particles which aggregate to give a malleable mass which crumbles upon vigorous stirring.

The process of the invention continues with the dissociation phase, which leads to the solubilization of the glycosaminoglycans.

This can be carried out using various techniques:

electrostatic displacement, using salts such as sodium sulfate for example, up to concentrations of between 0.7 and 2 moles per liter;

ionic displacement, by increasing the pH of the suspension medium up to values of between 9.5 and 12.5;

combination of these two techniques.

The alkalinization of the medium consists in dispersing, with vigorous stirring, the chitosan/glycosaminoglycan complex in a volume of water five to ten times greater than that of the precipitate, then the suspension is brought to a pH between 9.5 and 12.5, preferably 11, by adding a concentrated solution of alkaline hydroxides, such as sodium hydroxide or potassium hydroxide, and it is stirred slowly for two to twenty-four hours. At the end of this period, which varies as a function of the operating conditions, such as the granulometry of the particles of the complex, the ionic strength, the pH of the medium and the temperature, the solubilization reaction is complete. The chitosan thus obtained in solid form is separated from the sGAG solution by filtration or centrifugation. It is washed with water, then kept in moist form at +4° C., or dehydrated by known methods (heat, vacuum, solvents). It is thereby recycled for other operations for purification of the sGAG.

The chitosan loss during the various stages of purification is estimated at 2-4% of the initial weight.

The glycosaminoglycan solution completely freed of chitosan is neutralized or acidified to a pH of the order of 2.

The purified combined solution or solutions of sulfated glycosaminoglycans are advantageously dialyzed against water in order to remove the majority of the salts. The dialyzate can be used as such, or concentrated by customary techniques such as evaporation or ultrafiltration until solutions are obtained containing from 2 to 20% of dry matter. From these solutions the sGAG can be obtained in solid form, either by precipitation in ethyl alcohol or by simple lyophilization or dehydration. The dialysis stage can be omitted in the case where ultrafiltration is used as concentration means, and if the sGAG are obtained in solid form from the concentrated solution, by precipitation with ethanol or with another alcohol.

With a view to completing the illustration of the process according to the invention, seven non-limiting examples of implementation of the latter are described hereinbelow.

EXAMPLE 1

200 g of dry extract of chondroitin 4-sulfate and 6-sulfate containing approximately 130 g of pure sGAG in the form of sodium salt (assay of hexosamines) are dissolved in 10 kg of water, and the solution is brought to pH 2 using an aqueous solution of 5N hydrochloric acid. The solution is centrifuged, after 20 minutes of stirring, at 2,000 g for ten minutes. A chitosan solution is added to the clear supernatant until precipitation is complete.

The mother solution of chitosan is prepared by dissolving 100 g of purified chitosan in 10 kg of water maintained at pH 2 by addition of 5N hydrochloric acid.

The suspension is stirred for thirty minutes, then left to stand for fifteen minutes, and then the supernatant is removed (detection of glycosaminoglycans by precipitation with Alcian blue: negative).

The sticky precipitate obtained is dispersed by grinding, using a homogenizer marketed under the trade name "Turrax", in 5 kg of demineralized water, then, after fifteen minutes of stirring, the precipitate is collected by decantation. The precipitate is then dispersed in 1.7 kg of water, and aqueous 5N sodium hydroxide is added up to a stable pH of 10. After three and a half hours of stirring, the suspension is filtered, and the filtrate is brought to pH 7 using 6N hydrochloric acid. The residue consisting of chitosan is washed with 1 kg of water and then dried, and the wash waters are mixed with the above filtrate after being adjusted to pH 7.

The solution obtained is dialyzed continuously against demineralized water, and the dialyzate is filtered on 40 μm cellulose and then concentrated by evaporation and finally lyophilized.

The weight of the lyophilizate obtained is 141 g, comprising approximately 9 g of water and $127\pm5$ g of glycosaminoglycans (assay of hexosamines).

The assay of the proteins by the Lowry method gave the following results:

raw sGAG extract: 32% equivalent BSA lyophilizate: 0.35% equivalent BSA.

The assay carried out by the biuret method gave 24% for the raw extracts and non-detectable quantities, that is to say less than 0.5%, for the lyophilizates.

EXAMPLE 2

Same procedure as above, but the chitosan solution is obtained in an acetic acid medium at pH 3.5.

EXAMPLE 3

Same procedure as in Example 2, but the acetic acid is replaced by formic acid at pH 2.8.

EXAMPLE 4

Same procedure as in Example 1, but the solutions of sGAG and chitosan are acidified with pure formic acid until a pH of 2.8 is obtained.

EXAMPLE 5

Procedure identical to Example 4, but the formic acid is replaced by acetic acid at pH 3.5.

EXAMPLE 6

Procedure identical to Example 1.

The precipitate is dispersed in 1.5 kg of water, then 64 g of anhydrous sodium sulfate are added, with vigorous stirring, to the suspension obtained. Stirring is continued for 24 h, then the viscous medium obtained is centrifuged. The deposit is dispersed in 0.8 kg of water and stirred for 2 h, then the suspension is centrifuged. The supernatant is then mixed with the previous supernatant, and the solution obtained is brought to pH 7 using a 5N sodium hydroxide solution. After continuous dialysis against demineralized water, the solution is filtered on 40 μm cellulose, then lyophilized to give the purified sGAG in its disodium.

The deposit obtained above in the second centrifugation is suspended in 2 kg of water, and the pH is brought to 11 using a 5N sodium hydroxide solution. After stirring for 2 h, the suspension is filtered or centrifuged, and the residue is washed with demineralized water until neutrality of the run-off.

EXAMPLE 7

5 kg of chondroitin 4-sulfate and 6-sulfate are dissolved in 200 kg of demineralized water and the solution is brought to pH 2 using 5N hydrochloric acid. The solution is centrifuged continuously, after 45 min of stirring, at 2,000 g. A chitosan solution is added to the clear supernatant until precipitation is complete.

The chitosan solution is prepared by dissolving 2.5 kg of purified chitosan in 250 kg of demineralized water maintained at pH 2 by addition of 5N hydrochloric acid.

The precipitation medium is stirred for 1 h, then the liquid phase is removed after decantation of the complex. 150 kg of water at pH 2 are added to the solid residue, and the mixture is stirred for 1 h and then centrifuged continuously at 2,000 g to give a sticky mass of 15-20 kg. The latter is dispersed in 50 kg of water, with vigorous stirring, and 1.6 kg of anhydrous sodium sulfate are then added. The suspension is stirred for 4 h, and then 5N aqueous sodium hydroxide is added until a stable pH of 10 is reached. The suspension is stirred for 16 h, and the mixture is then filtered. The residue is resuspended in 10 kg of water and stirred for 2 h. After filtration, the filtrates are combined and brought to pH 7 by 5N HCl, and then dialyzed continuously against demineralized water. The dialyzates are filtered on 40 μm cellulose and then lyophilized.

We claim:

1. A process for separation of sulfated glycosaminoglycans (abbreviated to sGAG) from a starting complex medium comprising in solution at least one sGAG and contaminants with amino acid groups, in which process the sGAG is selectively precipitated by complexing with a water-soluble polyamine, wherein:
   in a first precipitation stage, the water-soluble polyamine is mixed with the starting complex medium, while maintaining the pH of the mixture at a value below the ionic dissociation potential (pKa) of the free carboxyl groups of contaminants and sGAG, in order to obtain selectively a precipitated ionic macromolecular complex, essentially between the sGAG and the water-soluble polyamine.
   in a second stage, in a suspension medium of the precipitate, the sGAG is solubilized and at the same time the polyamine is maintained in insoluble form, the suspension medium comprising a concomitant displacing agent of ionized carboxyl groups of the sGAG and ionized amine groups of the polyamine, the water-soluble polyamine being soluble both in the starting complex medium and the suspension medium of the precipitate.

2. The process as claimed in claim 1, wherein the displacing agent is a polyvalent anion salt.

3. The process as claimed in claim 1, wherein the displacing agent is a strong inorganic base.

4. The process as claimed in claim 3, wherein the suspension medium of the precipitate is brought with the base to a pH between 8.5 and 11.

5. The process as claimed in claim 2, wherein the second stage is carried out in two steps, namely a first step with a medium containing divalent salt, and a second step with an alkaline medium.

6. The process as claimed in claim 1, wherein the polyamine is chitosan having a molecular weight greater than 50 KD and a degree of acetylation of between 0 and 30%.

7. The process as claimed in claim 1, wherein the first precipitation stage comprises the following substages:
   (a) acidification of the starting complex medium to bring it to a pH of between 1 and 4
   (b) preparation of an acid solution of the polyamine at a pH of between 1 and 4
   (c) mixing, with stirring, of the acidified complex medium and the polyamine acid solution.

8. The process as claimed in claim 1, wherein the sGAG solution obtained in the second stage is neutralized by means of an acid or a base, then the salts are separated from the liquid solution in order to obtain a purified sGAG fraction.

9. The process as claimed in claim 1, wherein the contaminants include at least one member selected from the group consisting of proteins and peptides.

10. The process as claimed in claim 1, wherein the polyamine is chitosan.

11. The process as claimed in claim 2, wherein the polyvalent anion salt is an alkaline sulfate.

12. The process as claimed in claim 3, wherein the inorganic base is selected from the group consisting of sodium hydroxide and potassium hydroxide.

13. The process as claimed in claim 3, wherein the second stage is carried out in two steps, namely a first step with a medium containing divalent salt, and a second step with an alkaline medium.

* * * * *